(12) United States Patent
Thomassey

(10) Patent No.: US 11,392,142 B2
(45) Date of Patent: Jul. 19, 2022

(54) SAFE METHOD AND A SAFE SYSTEM FOR CONTROLLING A POSITION OF AN AIRCRAFT RELATIVE TO THE AUTHORIZED FLIGHT ENVELOPE

(71) Applicant: AIRBUS HELICOPTERS, Marignane (FR)

(72) Inventor: Lionel Thomassey, Fos sur Mer (FR)

(73) Assignee: AIRBUS HELICOPTERS, Marignane (FR)

( * ) Notice: Subject to any disclaimer, the term of this patent is extended or adjusted under 35 U.S.C. 154(b) by 224 days.

(21) Appl. No.: 16/850,296

(22) Filed: Apr. 16, 2020

(65) Prior Publication Data
US 2020/0341492 A1    Oct. 29, 2020

(30) Foreign Application Priority Data
Apr. 23, 2019 (FR) ..................... 1904264

(51) Int. Cl.
*G05D 1/00* (2006.01)
*B64C 39/02* (2006.01)
(Continued)

(52) U.S. Cl.
CPC ............ *G05D 1/101* (2013.01); *B64C 13/18* (2013.01); *B64C 19/00* (2013.01); *B64C 39/024* (2013.01); *B64D 27/24* (2013.01); *B64C 2201/027* (2013.01); *B64C 2201/042* (2013.01); *B64C 2201/108* (2013.01); *B64C 2201/141* (2013.01)

(58) Field of Classification Search
CPC ...... G05D 1/101; G05D 1/0077; G05D 1/106; G05D 1/102; G05D 1/00; B64C 13/18;
(Continued)

(56) References Cited

U.S. PATENT DOCUMENTS 1,372,184 A    3/1921    Nicolai
4,105,900 A    8/1978    Martin et al.
(Continued)

FOREIGN PATENT DOCUMENTS

EP    3361344 A1    8/2018
FR    1525230 A    5/1968

OTHER PUBLICATIONS

French Search Report for French Application No. FR1904264, Completed by the French Patent Office, dated Jan. 28, 2020 7 pages.

*Primary Examiner* — Yonel Beaulieu
(74) *Attorney, Agent, or Firm* — Brooks Kushman P.C.

(57) ABSTRACT

A safe control method and a safe control system for performing control relative to an authorized flight envelope of an aircraft. The aircraft includes a digital main measurement system for measuring flight characteristics of the aircraft, a flight control system for automatically piloting the aircraft, and said safe control system. The safe control system includes an analog backup measurement system that delivers at least one analog signal that is a function of the at least one flight characteristic, and a switch-over device that is configured so that the flight control system uses the at least one analog signal delivered by the backup measurement system for automatically piloting the aircraft whenever at least one flight characteristic of the aircraft exceeds a predetermined limit of the authorized flight envelope.

20 Claims, 2 Drawing Sheets

(51) Int. Cl.
    *B64C 19/00*     (2006.01)
    *B64C 13/18*     (2006.01)
    *B64D 27/24*     (2006.01)
    *B64D 27/00*     (2006.01)
    *G05D 1/10*     (2006.01)

(58) Field of Classification Search
    CPC . B64C 19/00; B64C 39/024; B64C 2201/027; B64C 2201/042; B64C 2201/108; B64C 2201/141; B64C 39/02; B64D 27/24
    See application file for complete search history.

(56) References Cited

U.S. PATENT DOCUMENTS

| | | | |
|---|---|---|---|
| 6,675,095 B1* | 1/2004 | Bird | G05D 1/0061 |
| | | | 701/301 |
| 9,132,913 B1* | 9/2015 | Shapiro | G08G 5/0086 |
| 9,633,567 B1* | 4/2017 | Skoog | G06F 30/20 |
| 9,972,143 B1* | 5/2018 | Garai | B64D 45/00 |
| 10,656,643 B1* | 5/2020 | Bertram | G05D 1/0077 |
| 2008/0133069 A1* | 6/2008 | Morales De La Rica | |
| | | | G05D 1/106 |
| | | | 701/4 |
| 2016/0085239 A1* | 3/2016 | Boyer | G08G 5/025 |
| | | | 701/5 |
| 2016/0200421 A1* | 7/2016 | Morrison | G01C 23/00 |
| | | | 244/17.23 |
| 2016/0210863 A1* | 7/2016 | Kohn-Rich | G08G 5/0086 |
| 2016/0244161 A1* | 8/2016 | McClure | G05D 1/0022 |
| 2018/0134400 A1* | 5/2018 | Knapp | G08G 5/0086 |
| 2018/0224848 A1 | 8/2018 | Vieux | |
| 2018/0275654 A1* | 9/2018 | Merz | G08G 5/0086 |
| 2020/0074857 A1* | 3/2020 | Karabinis | G08G 1/096791 |
| 2021/0051143 A1* | 2/2021 | Nelson | H04L 63/0876 |
| 2022/0018972 A1* | 1/2022 | Bennington | G05D 1/0212 |

* cited by examiner

SAFE METHOD AND A SAFE SYSTEM FOR CONTROLLING A POSITION OF AN AIRCRAFT RELATIVE TO THE AUTHORIZED FLIGHT ENVELOPE

CROSS-REFERENCE TO RELATED APPLICATIONS

This application claims priority to French patent application No. FR 19 04264 filed on Apr. 23, 2019, the disclosure of which is incorporated in its entirety by reference herein.

BACKGROUND OF THE INVENTION

(1) Field of the Invention

The present invention relates to the field of aircraft, and more particularly to the field of devices for controlling the attitude or trim and the height of flight of an aircraft, in particular a drone.

(2) Description of Related Art

The present invention relates to a safe method of controlling a position of an aircraft relative to the authorized flight envelope, and to a safe control system for controlling a position of an aircraft relative to the authorized flight envelope. The present invention also relates to a safe control set for controlling a position of an aircraft relative to an authorized flight envelope, and to an aircraft including such a system. The present invention is particularly applicable to drones.

Use of drones, also known as "Unmanned Aerial Vehicles" or "UAVs", has developed considerably in recent years. Therefore, drone traffic is likely to become considerable, in particular in urban areas or in rural-urban fringe areas.

In order to limit the risks of collision between a drone and another aircraft, an airspace management system dedicated to drones and known as the "Unmanned Aircraft System Traffic Management" system or "UTM" system is being developed to supplement the existing "Air Traffic Management" or "ATM" system for aircraft flying in controlled areas. The airspace dedicated to drones is, for example, limited to heights of flight above a reference ground level that are less than 500 feet, one foot being equal to 0.3048 meters, whereas the airspace dedicated to aircraft is situated at heights of flight about a reference ground level that are greater than or equal to 500 feet. In this specification, the term "height of flight" of an aircraft is used to mean the distance measured vertically between the aircraft and a reference ground level while the aircraft is overflying the ground. The term "height of flight" of an aircraft is also used to mean its altitude while the aircraft is overflying the sea.

In order to remain within the airspace authorized by the UTM system, a drone generally includes a device for controlling its height of flight. However, drones sometimes leave their dedicated airspace and find themselves in the airspace dedicated to aircraft following a failure of the device for controlling the height of flight or following a loss of a maximum height of flight setpoint corresponding to the flight ceiling for the drone, or indeed due to a big gust of wind, for example.

Furthermore, there is a risk that a drone might crash into the ground when it takes up an attitude corresponding to large trim angles and then does not manage to return to a substantially horizontal attitude. Other functions, in particular deployment of a parachute or of an airbag can then be triggered reliably only when the drone is a in a substantially horizontal attitude.

Drones used up until now have been piloted by "simplex" flight controllers, a "simplex" flight controller being one that is not backed up, and that is connected to a single inertial unit, or indeed to a plurality of inertial units.

In order to limit the risks of accident, the flight controller of a drone currently tends to have a high level of safety that is quantified by a criticality level known as the "Design Assurance Level" or "DAL", and that depends on the safety systems it includes.

However, uncertified inertial units can be connected to a flight controller independently of its DAL. Such inertial units can limit the improvement of the safety procured by a safe flight controller.

Furthermore, the prior art discloses many items of equipment that make it possible to determine the orientations and/or the movements of a vehicle, in particular an aircraft, as well as devices for assisting with the navigation of such vehicles.

For example, Document FR 1 525 230 discloses a stabilization device and a detector for detecting the apparent vertical, those items of equipment making it possible to stabilize a platform that is mounted to move in rotation about an axis so that that platform remains perpendicular to the apparent vertical. That apparent vertical detector includes a swing pendulum, a flywheel mounted to rotate about a pin secured to the pendulum, and slidably mounted angular coupling means generating braking torque and arranged between said pin and the flywheel. The stabilization device includes a servo-control circuit, an electric motor, and a gear train driving the moving platform in rotation in order to perform the stabilization.

Document EP 3 361 344 discloses an autopilot system for an aircraft, in particular a drone, which system includes a plurality of sets of sensors that are redundant and mutually independent, a plurality of calculation channels that are redundant and mutually independent, and a supervisor. The sets of sensors are designed to evaluate the position and the movements of the aircraft, each calculation channel being connected to the sensors of a set of sensors. The supervisor couples a single calculation channel to the flight control members of the aircraft and decouples said calculation channel when a current behavior of the aircraft departs from a predetermined predicted behavior.

Finally, Document U.S. Pat. No. 1,372,184 discloses apparatus for detecting and measuring the angular velocity of a ship about an axis, without being influenced by any movements about other axes. That apparatus includes two gyroscopes, a differential mechanism, and a compensating device. The two gyroscopes spin in opposite directions and their tilting movements are combined by means of the differential mechanism. The compensating device neutralizes the perturbing forces that cannot be eliminated by the differential mechanism. That ship does not, therefore, lie within the technical field of the invention.

The prior art also discloses devices making it possible to determine atmospheric pressure, in particular for estimating the barometric altitude or indeed the height of flight of an aircraft. For example, a mercury barometer has a U-shaped tube closed at one end and open at the other end. The tube contains mercury and a gas confined at the closed end of the tube. The mercury moves as a function of the variations in the atmospheric pressure of the surrounding atmosphere.

Gas barometers also exist that do not contain any mercury. The atmospheric pressure is measured by means of an enclosed volume of gas that is compressed or that expands as a function of atmospheric pressure.

The technological background of the invention also includes Documents US 2016/0244161 and U.S. Pat. No. 4,105,900.

Furthermore, a drone can have backup functions for stabilizing the trim angles of the drone in rolling or in pitching, and for limiting its flight ceiling. Such functions are often performed by software, with or without redundancy, but that is sensitive to a lot of perturbations, disturbances and interference of all kinds.

Thus, the prior art suffers from various drawbacks in the field of drones. In particular, the level of safety of a drone can be guaranteed by using a plurality of flight controllers that are redundant, dissimilar, and monitored by a supervisor in order to mitigate electrical or electronic failures. However, in the event of software problems or indeed of electronic interference or jamming in particular, the function guaranteeing compliance with the flight ceiling might no longer be operational and/or reliable, possibly leading to the drone entering the airspace for aircraft or merely to it leaving its authorized flight area.

BRIEF SUMMARY OF THE INVENTION

An object of the present invention is thus to provide a safe method of controlling a position of an aircraft relative to the authorized flight envelope and a safe control system for controlling a position of an aircraft relative to the authorized flight envelope that make it possible to overcome the above-mentioned drawbacks.

The authorized flight envelope of an aircraft, and in particular of a drone, may be limited firstly by a flight ceiling, namely by limiting a height of flight of the aircraft, and secondly by a setpoint attitude established by limiting the trim angles of the drone about its roll and pitch axes, and possibly by limiting the angular velocities of the drone, in particular about its yaw axis.

The present invention provides a safe method of controlling a position of an aircraft relative to an authorized flight envelope, said safe method comprising the following steps:

measuring a first value for at least one flight characteristic of the aircraft by means of a main measurement system of the aircraft, said at least one flight characteristic being used by a flight control system of the aircraft for automatically piloting the aircraft;

emitting at least one analog signal that is a function of said at least one flight characteristic of the aircraft by means of an analog backup measurement system of the aircraft;

applying a first autopilot mode for automatically piloting the aircraft that is implemented by default by the flight control system by using said first value for at least one flight characteristic of the aircraft for automatically piloting the aircraft; and applying a second autopilot mode for automatically piloting the aircraft that is implemented by the flight control system by using said at least one analog signal for automatically piloting the aircraft whenever at least one of said at least one flight characteristic of the aircraft exceeds a predetermined limit, or indeed whenever at least one difference between a first value for a flight characteristic and a second value for said flight characteristic that is determined on the basis of an analog signal is greater than or equal to a predetermined value.

For example, the aircraft may be a drone including at least one lift rotor, and in particular a multi-rotor drone, namely a drone including a plurality of lift rotors.

The flight characteristics of the aircraft include, in particular, the attitude or trim of the aircraft, namely the trim angles of the aircraft about its roll and pitch axes, and/or its position, in particular its height of flight and/or optionally the angular velocities of the aircraft about its roll, pitch and yaw axes. The flight characteristics may also include the variations in the trim angles, in the angular velocities, and/or in the height of flight of the aircraft.

By default, the flight system of the aircraft uses said first value for each flight characteristic as measured by a main measurement system for automatically piloting the aircraft, in particular while the aircraft is operating without any failure and/or without any malfunction.

An aircraft may include a plurality of main measurement systems that operate redundantly in order to mitigate any failures and/or malfunctions. An aircraft may also include a plurality of main measurement systems that operate in parallel. Median values for the flight characteristics are then determined on the basis of the measurements taken by said main measurement systems or indeed a voter determines said flight characteristics using usual methods.

For example, a main measurement system of the aircraft may include one or more inertial units and one or more accelerometers. A main measurement system may be a digital measurement system.

A digital system or a digital method uses and processes physical quantities represented by means of digits or of signals having discrete values for any one physical quantity. A digital system or a digital method may, in particular, use a computer program or a microprocessor or the like for processing the data that is handled. A digital system or a digital method can be opposed to an "analog" system or to an "analog" method.

An analog system or method uses and processes physical quantities that are measured by a continuous function or that are represented by a signal having continuous variations, e.g. a voltage. Furthermore, an analog system or an analog method can process the data that is handled without using any programmable language, any computer program, or any software, and without using any microprocessor.

Therefore, a digital system is much more sensitive than an analog system to various perturbations, such as an electrical or electronic failure or a computer error, consequent, for example, on electromagnetic interference or disturbance, or indeed on electronic interference or jamming, or indeed on a computing error or merely an input error.

Therefore, the invention includes a step of emitting at least one analog signal, and that step is performed by an analog backup measurement system for taking a backup measurement of at least one of the flight characteristics, or indeed of all of the flight characteristics used by the flight system. A backup measurement system makes it possible to mitigate a failure or a malfunction of the main measurement system of the aircraft or indeed of the main measurement systems when the aircraft has more than one main measurement system.

In the context of the invention, a backup measurement system is an analog system that is advantageously relatively insensitive to and more tolerant of electromagnetic disturbance or interference, electronic interference or jamming, computer error, or computer failure.

Although present on the aircraft mainly for mitigating failure or malfunctioning of the main measurement system(s), a backup measurement system delivers, continuously and in parallel with the main measurement system(s), at least one analog signal that is a function of at least one flight characteristic that is also measured by the main measurement system(s).

In addition, an aircraft may include a plurality of backup measurement systems that operate redundantly in order to mitigate any failures and/or malfunctions. An aircraft can also have a plurality of backup measurement systems that operate in parallel, median values for the flight characteristics being determined or indeed a voter determining at least one flight characteristic on the basis of the analog signals delivered by the backup measurement systems.

Furthermore, a flight control system of the aircraft may use the flight characteristics of the aircraft that are deemed to be the most reliable from among those that are delivered by means of at least one main measurement system and by means of a backup measurement system in order to implement the automatic piloting of the aircraft reliably and safely.

Thus, the first autopilot mode for automatically piloting the aircraft is, by default, implemented by the flight control system by using a first value for at least one flight characteristic measured by a main measurement system.

However, whenever a potentially hazardous situation or a risk of perturbation of the measurement taken by a main measurement system is identified, the flight control system implements the second autopilot mode for automatically piloting the aircraft, advantageously by using the at least one analog signal emitted by a backup measurement system in order to implement the automatic piloting of the aircraft safely and reliably, possibly until an emergency landing is made if necessary. The method of the invention thus advantageously constitutes a reinforced and safe control method for performing control relative to an authorized flight envelope of an aircraft that advantageously uses flight characteristics that are deemed to be reliable and not perturbed for performing the second autopilot mode for automatically piloting the aircraft.

The second autopilot mode may, in particular, be implemented when the aircraft is coming close to a limit of its authorized flight envelope, or indeed leaves said authorized flight envelope. This condition is identified when at least one flight characteristic of the aircraft exceeds a predetermined limit of said authorized flight envelope. Thus, whenever a flight characteristic of the aircraft exceeds a predetermined limit of the authorized flight envelope of the aircraft, the method of the invention switches over from the first autopilot mode to the second autopilot mode.

The predetermined limits of said authorized flight envelope may take into account a safety margin relative to the real limits of the authorized flight envelope of the aircraft, in particular so as to anticipate the aircraft leaving the authorized flight envelope. A real limit of the authorized flight envelope is, for example, a flight ceiling and/or a setpoint attitude as defined, for example, by aviation regulations or indeed by the structural limitations of the aircraft.

The flight characteristics that are compared with the predetermined limits of an authorized flight envelope may be delivered by a main measurement system or indeed by a backup measurement system.

The flight characteristics as delivered by a main measurement system and by a backup measurement system may also be compared simultaneously with the predetermined limits of the authorized flight envelope. In this situation, whenever at least one flight characteristic as measured by a main measurement system or indeed by a backup measurement system exceeds at least one predetermined limit of the authorized flight envelope, the main measurement system(s) is/are ignored and one or more backup measurement systems are taken into account for automatically piloting the aircraft.

During the second autopilot mode, the method of the invention may also advantageously pilot re-establishment of the attitude of the aircraft below the predetermined limit and/or may guarantee compliance with the flight ceiling of the aircraft in the event the authorized envelope is exceeded.

For example, with the aircraft including at least one lift rotor driven in rotation by an electric motor, the second autopilot mode may include a sub-step of controlling a control unit that controls each motor by means of said at least one analog signal for the purpose of electrically powering each motor driving a lift rotor. For example, the analog signal may be a voltage.

The control unit, referred to as an "Electronic Speed Control" or "ESC" unit, is connected to at least one motor. The analog signal is thus used directly during the second autopilot mode by the ESC unit for the purpose of electrically powering each motor. In this way, the aircraft descends at controlled speed by means of the variation in the voltage representing, in particular, the height of flight, until it reaches a height of flight that is substantially equal to the predetermined limit, and then the aircraft becomes stabilized automatically by means of said voltage at the height of flight substantially equal to said predetermined limit.

Furthermore, the switch-over between the first autopilot mode and the second auto-pilot mode advantageously takes place in the event of proximity to the limits of the authorized flight envelope, and not on the basis of an analysis of the state of operation of the main measurement system.

The second autopilot mode may also be implemented following a comparison of one or more flight characteristics as measured by a main measurement system with the same flight characteristic(s) as delivered by at least one backup measurement system when a significant difference between them is detected, in particular a difference greater than or equal to the predetermined value.

Such a significant difference greater than or equal to the predetermined value makes it possible to identify the possible presence of a malfunction or of a failure on the main measurement system. In this way, the method of the invention advantageously limits the risk of the flight control system using flight characteristics that have reliability and accuracy that are not guaranteed for automatically piloting the aircraft. The use of an analog signal by the method of the invention for a backup solution procures an additional layer of safety and of availability for the systems of the aircraft.

The method of the invention thus advantageously makes it possible to detect and to mitigate firstly a risk of leaving the authorized flight envelope and secondly a potential malfunction or failure of the main measurement system of the aircraft.

The comparison of at least one flight characteristic with a predetermined limit of the flight envelope or indeed with another value for that flight characteristic may be performed digitally. The analog signal emitted by a backup measurement system is then transformed into a second digital value in usual manner, e.g. by an analog-to-digital converter.

The comparison of at least one flight characteristic with a predetermined limit of the flight envelope or indeed with another value for that flight characteristic may be also performed analogically. A first value for at least one flight characteristic as measured by a digital main measurement system is then transformed in usual manner into an analog signal, e.g. by a digital-to-analog converter. The analog signal may thus be used directly as emitted by the backup measurement system.

The height of flight of the aircraft may be a flight characteristic of the aircraft. For example, the height of flight may be measured by comparing a current atmospheric pressure with a reference pressure in an analog backup measurement system. For example, the reference pressure corresponds to the atmospheric pressure of the air at the takeoff area from which the aircraft took off.

The emitting step may then comprise the following steps:

varying an electrical resistance as a function of a difference between the outside atmospheric pressure outside the aircraft and the reference pressure; and generating an analog signal that is proportional to the electrical resistance and therefore that is a function of the height of flight of the aircraft relative to the reference ground level.

The attitude or trim of the aircraft may also be taken into account through a flight characteristic of the trim angle type. For example, the variations in the trim angles of the aircraft may be determined by integrating angular velocities as measured about respective ones of the pitch and roll axes. For example, this integration may be performed analogically, typically by an operational amplifier. This integration may also be performed digitally.

For example, an analog backup measurement system of the aircraft may include a plurality of gyroscope rate gyros, each of which is provided with a first measurement device that delivers an analog signal making it possible to determine an angular velocity, and to deduce an attitude therefrom.

The emitting step may then comprise the following steps:

generating at least two analog signals, which generation is performed by at least two gyroscope rate gyros arranged on respective ones of the pitch and roll axes;

determining angular velocities for the aircraft about the pitch and roll axes on the basis of the at least two analog signals; and determining the trim angles by integrating the angular velocities.

Furthermore, an analog backup measurement system of the aircraft may include two pendulums mounted to swing freely about respective ones of the pitch and roll axes on either side of an apparent vertical of the aircraft. The apparent vertical of the aircraft is a direction of the apparent weight of the aircraft and is defined in usual manner by a combination of the acceleration of the aircraft and of the acceleration of the Earth's gravity.

Therefore, using a second measurement device to measure the swings of each pendulum makes it possible to determine an analog signal that is proportional to an angle of inclination of the pendulum relative to an apparent vertical of the aircraft about the swing axis of the pendulum, namely about the pitch axis or about the roll axis. This angle of inclination of the pendulum is equal to a trim angle of the aircraft that is thus advantageously determined without calculation, and in particular without any integration operation.

Furthermore, the emitting step may then include the following steps:

generating at least two analog signals as a function of respective ones of the angles of inclination of at least two pendulums relative to an apparent vertical of the aircraft about respective ones of the pitch and roll axes;

determining the angles of inclination of the pendulums on the basis of the at least two analog signals; and determining the trim angles of the aircraft about respective ones of the pitch and roll axes that are equal to the angles of inclination of the pendulums.

The trim angles of the aircraft about respective ones of the pitch and roll axes may also be determined respectively by hybridization of the values of the integrals of the angular velocities measured by gyroscope rate gyros and of the values of the pendulum swings.

The emitting step may include the following steps:

generating at least two analog signals, which generation is performed by at least two gyroscope rate gyros arranged on respective ones of the pitch and roll axes;

determining angular velocities for the aircraft about the pitch and roll axes on the basis of the at least two analog signals;

generating at least two analog signals as a function of respective ones of the angles of inclination of at least two pendulums relative to an apparent vertical of the aircraft about respective ones of the pitch and roll axes;

determining the angles of inclination of the pendulums on the basis of the at least two analog signals; and determining trim angles by hybridization firstly of the integrals of the angular velocities of the aircraft about the pitch and roll axes and secondly of the angles of inclination of the pendulums.

Furthermore, during the emitting step, said at least one analog signal delivered by means of a backup measurement system may include at least one piloting analog signal and at least one switch-over analog signal. A piloting analog signal is thus dedicated to the second autopilot mode of the aircraft and a switch-over analog signal is dedicated to comparing a flight characteristic of the aircraft with a predetermined limit of the authorized flight envelope or indeed with a first value for said flight characteristic.

The above-mentioned two pendulums may, for example, deliver respective switch-over analog signals and the gyroscope rate gyros deliver the piloting analog signals. The second autopilot mode is implemented whenever an angle of inclination of one of the pendulums that is carried by a switch-over analog signal is greater than a first threshold corresponding to a predetermined limit of the authorized flight envelope.

A predetermined limit may also take into account a notion of height of flight and, for example, include a second threshold and a critical height of flight, the second threshold being less than the first threshold. For example, the second autopilot mode is implemented when firstly the angle of inclination of one of the pendulums is greater than the second threshold and secondly the height of flight of the aircraft is less than a critical height of flight.

A predetermined limit may also take into account a time value and, for example, have a threshold and a critical duration. For example, the second autopilot mode may be implemented firstly when a flight characteristic is greater than said threshold and secondly if a duration necessary for that flight characteristic of the aircraft to return to a value less than or equal to said threshold is greater than a critical duration.

For example, with the flight characteristic being the height of flight, the second autopilot mode may be implemented firstly when the height of flight is greater than said threshold and secondly if a duration necessary for the aircraft to return to height of flight less than or equal to said threshold is greater than a critical duration. In this way, the method of the invention tolerates the authorized flight ceiling being exceeded momentarily, it being possible for the critical duration to depend on the performance of the aircraft.

The present invention also provides a safe control system for controlling a position of an aircraft relative to an authorized flight envelope, the aircraft including:

at least one main measurement system for measuring a first value for at least one flight characteristic of the aircraft; and a flight control system for automatically piloting the aircraft by using the flight characteristics of the aircraft.

The safe control system applies the above-described safe control method for controlling a position of an aircraft relative to an authorized flight envelope and includes:

at least one analog backup measurement system that delivers at least one analog signal that is a function of said at least one flight characteristic of the aircraft; and a switch-over device configured to transmit to the flight control system, at least the first value for at least one flight characteristic by default, and a second value for the at least one flight characteristic that is determined on the basis of an analog signal delivered by at least one analog backup measurement system whenever at least one flight characteristic exceeds a predetermined limit or indeed whenever at least one difference between the first value and the second value for a flight characteristic is greater than or equal to a predetermined value.

For example, the switch-over device may include at least one operational amplifier. The switch-over device may, for example, be a logic circuit constituting a hysteresis comparator that is also known as a "Schmitt trigger".

In this way, the switch-over device enables the flight control system to switch over from the first autopilot mode to the second autopilot mode as a function of the flight characteristics measured by at least one main measurement system and by at least one backup measurement system.

A main measurement system is preferably digital while a backup measurement system is analog.

A backup measurement system of the aircraft may include a first measurement subsystem for measuring a barometric altitude of the aircraft. For example, this first measurement subsystem may include a closed first chamber containing a fluid at a reference pressure, a second chamber in contact with an outside atmosphere outside the aircraft, and a piston arranged between the two chambers and moving when the current atmospheric pressure of the outside atmosphere outside the aircraft varies.

The height of flight of the aircraft may thus be determined by this first measurement subsystem by comparing the current atmospheric pressure with the reference pressure that corresponds, for example, to the atmospheric pressure of the air at the takeoff area from which the aircraft took off, this reference pressure optionally being adjustable.

The first measurement subsystem may also include a rheostat having a moving terminal connected to said piston. The piston moving thus leads to a variation in the resistance of at least one electrical resistor of the rheostat. The electrical resistance of the rheostat then varies in the presence of variation in the current atmospheric pressure, and therefore as a function of the height of flight of the aircraft.

For example, the rheostat is connected to the switch-over device in order to make it possible to switch over from the first autopilot mode to the second autopilot mode as a function of the variation in the electrical resistance of the rheostat. For example, the value for the electrical resistance of the rheostat may be compared with a setpoint value corresponding to a maximum height of flight setpoint. A voltage across the terminals of the electrical resistor may also be compared with a reference voltage corresponding to said maximum height of flight setpoint.

In this situation, the first measurement subsystem constitutes an analog backup measurement system, the height of flight of the aircraft being delivered by means of a value for a resistance or for a voltage that varies continuously. In addition, the switch-over device may be devoid of any computer and of any software. For example, the comparison may be performed by means of one or more comparators having operational amplifiers, flip-flop transistors and/or relays that switch over as a function of the value for the resistance of the resistor or indeed for the voltage across the terminals of the resistor.

With the aircraft including at least one lift rotor driven in rotation by an electric motor, the first measurement subsystem may, for example, deliver a voltage as an analog signal to an ESC unit connected to at least one electric motor. For example, this ESC unit may be integrated into the flight control system of the aircraft. The analog signal is thus used directly by the ESC unit for the purpose of electrically powering each electric motor, and enables the aircraft firstly to descend at controlled speed by means of the variation in the voltage until it reaches a height of flight that is substantially equal to the predetermined limit, and then to stabilize automatically at the height of flight substantially equal to this predetermined limit.

In one aspect, a backup measurement system of the aircraft may also include a second measurement subsystem for measuring the angular velocities, the trim angles of the aircraft, and the angles of inclination of the aircraft relative to an apparent vertical of the aircraft. For example, this second measurement subsystem includes at least two gyroscope rate gyros and two pendulums.

This second measurement subsystem may optionally include three gyroscope rate gyros in order to deliver, as flight characteristics, values for the angular velocities of the aircraft respectively about the pitch axis, about the roll axis, and about the yaw axis. Integration of these angular velocities makes it possible to determine respectively the trim angles and yaw angles of the aircraft or their respective variations.

Each pendulum is arranged to swing freely about the pitch axis or about the roll axis of the aircraft. During the movements of the aircraft, each pendulum swings on either side of an apparent vertical of the aircraft. The angles of inclination of the pendulums then represent the trim angles of the aircraft about respective ones of the roll and pitch axes.

The angles of inclination of the pendulums may be carried by switch-over analog signals that are used by the safe control system only, and by the switch-over device in particular, and that are dedicated to comparing the flight characteristics of the aircraft. The flight control system then uses the trim angles determined by integration of the angular velocities delivered by the gyroscope rate gyros for piloting the aircraft.

The angles of inclination of the pendulums may also be used firstly by the safe control system for comparing the flight characteristics of the aircraft and secondly by the flight control system. The flight control system thus uses the angular velocities delivered by the gyroscope rate gyros and the angles of inclination of the pendulums for piloting the aircraft. The pendulums advantageously serve both for piloting the aircraft and for detecting any leaving of the authorized flight envelope in analog manner.

Furthermore, the flight system may include a digital first flight control device and an analog second flight control device. The digital first flight control device is used when the flight control system uses a first value for at least one flight characteristic of the aircraft as measured by a main measurement system, and the analog second flight control device is used when the flight control system uses at least one analog signal that is a function of at least one flight characteristic of the aircraft as delivered by a backup measurement system.

In addition, a backup measurement system of the aircraft may include a plurality of measurement subsystems for measuring the same flight characteristic of the aircraft. At least two measurement subsystems may then be used simultaneously for comparing the flight characteristics and for automatically piloting the aircraft. At least two measurement subsystems may also be used differently, one measurement subsystem delivering at least one switch-over analog signal dedicated to a comparison of at least one flight characteristic, and the other measurement subsystem delivering at least one piloting analog signal dedicated to automatic piloting.

For example, a second measurement subsystem may include three gyroscope rate gyros and two sets of two pendulums. Thus, a first set of two pendulums deliver switch-over analog signals and a second set of two pendulums deliver piloting analog signals.

In one aspect, a backup measurement system of the aircraft is electrically powered in autonomous and independent manner, in particular relative to a main measurement system, e.g. by at least one dedicated electric battery. In this way, a backup measurement system of the aircraft is powered, including in the event of malfunctioning or failure of the power supply device for powering the main measurement system. Furthermore, a backup measurement system may include a plurality of electric batteries dedicated respectively and independently to powering respective ones of the measurement subsystems it includes.

The present invention also provides a safe control set for controlling a position of an aircraft relative to an authorized flight envelope. This safe control set includes:

at least one main measurement system for measuring a first value for at least one flight characteristic of the aircraft;

a safe control system for controlling a position of an aircraft relative to an authorized flight envelope and as described above; and a flight control system connected in particular to the switch-over device of the safe control system and automatically piloting the aircraft.

Finally, the present invention provides an aircraft including:

at least one lift rotor; and a safe control set for controlling a position of an aircraft relative to an authorized flight envelope and as described above.

For example, the aircraft may be a drone including at least one lift rotor, and in particular a multi-rotor drone, namely a drone including at least two lift rotors.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements that are present in more than one of the figures are given the same references in each of them.

Figure 1:
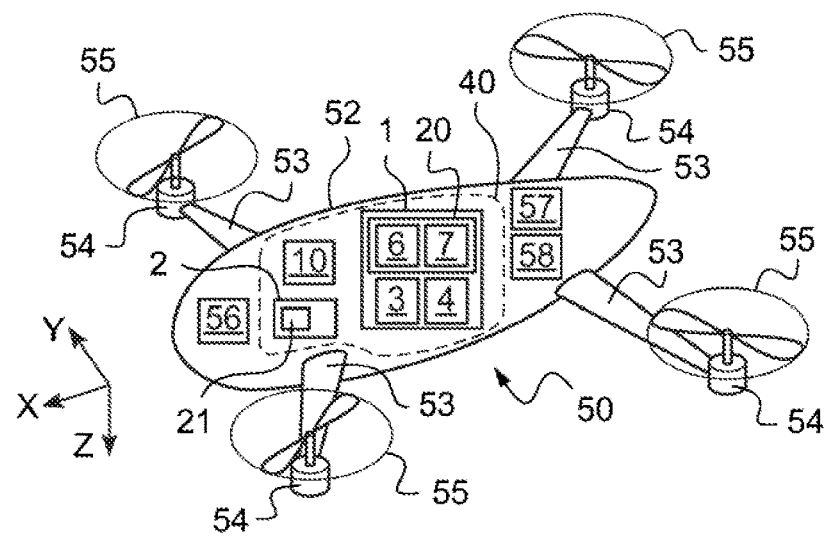
FIG. 1 shows an aircraft including a safe control system for controlling its position relative to an authorized flight envelope.

An aircraft 50, shown in FIG. 1, includes a central body 52, four link arms 53 connected to the central body 52 and four lift rotors 55 supported by respective ones of the link arms 53. The lift rotors 55 are driven in rotation by four independent engines or motors 54, and they make it possible to provide propulsion and lift for the aircraft 50. For example, the aircraft 50 may be a drone. The four engines or motors 54 may, for example, be fuel-burning engines or electric motors. The aircraft 50 may be of some other type and have a different number of rotors and of engines or motors without going beyond the ambit of the invention.

A frame of reference (X,Y,Z) is shown in FIG. 1. A longitudinal direction X extends from the rear of the aircraft 50 towards the front of the aircraft 50. An elevation direction Z extends from top to bottom perpendicularly to the longitudinal direction X. A transverse direction Y extends from left to right perpendicularly to the longitudinal direction X and to the elevation direction Z. The longitudinal direction X is parallel to the roll axis of the aircraft 50, the transverse direction Y is parallel to its pitch axis, and the elevation direction Z is parallel to its yaw axis.

The central body 52 includes a flight control system 2, a main measurement system 10 that measures the flight characteristics of the aircraft 50, and a safe control system 1 for controlling a position of the aircraft 50 relative to an authorized flight envelope. The main measurement system 10 is preferably digital and, for example, it includes one or more inertial units and one or more accelerometers.

The central body 52 also includes an energy source 56 feeding or powering the four engines or motors 54, e.g. a fuel tank or indeed an electrical energy source, depending on the type(s) of the engines or motors 54. The main body 52 also includes a main electrical energy source 57 for electrically powering the flight control system 2 and the main measurement system 10, and a secondary electrical energy source 58 dedicated to the safe control system 1.

The safe control system 1 includes an analog backup measurement system 20 and a switch-over device 3.

The safe control system 1 is connected to the main measurement system 10 and to the flight control system 2. The flight control system 2 is connected to the engines or motors 54 driving the lift rotors 55 in order to control said engines or motors 54 as a function of the flight characteristics obtained by the main measurement system 10 or indeed by the backup measurement system 20 for automatically piloting the aircraft 50. The flight control system 2 may include a control unit 21 connected to the engines or motors 54 and designed to manage operation of them.

The flight characteristics of the aircraft 50 that are measured by the main measurement system 10 and by the backup measurement system 20 include one or more of the following characteristics: the trim angles of the aircraft 50 about its roll and pitch axes or indeed variations in those angles, the height of flight of the aircraft 50 or indeed the angular velocities of the aircraft 50 about its roll, pitch, and yaw axes. The main measurement system 10 and the backup measurement system 20 may include a plurality of measurement subsystems in order to measure said flight characteristics.

A safe control set 40 for controlling a position of an aircraft 50 relative to its authorized flight envelope then includes the main measurement system 10, the flight control system 2, and the safe control system 1 for controlling the position of the aircraft 50 relative to the authorized flight envelope.

Figure 2:
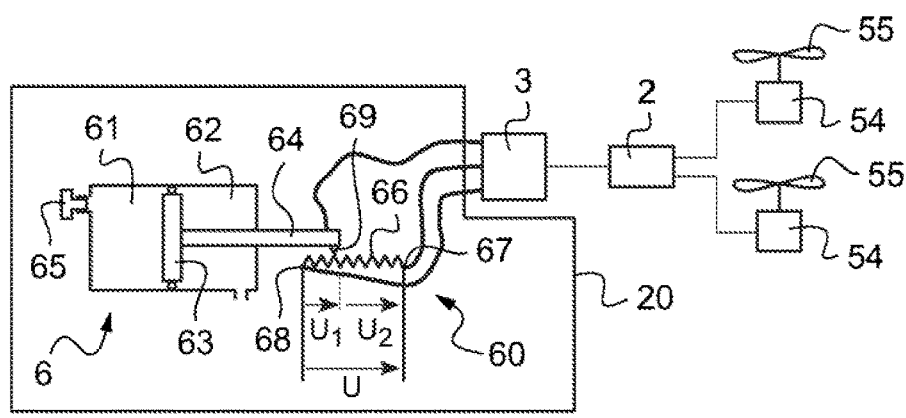
FIG. 2 shows a first measurement subsystem of a backup measurement system.

The backup measurement system 20 may include a first measurement subsystem 6 for measuring the height of flight of the aircraft 50 and as shown in FIG. 2. The first measurement subsystem 6 includes a first chamber 61, a second chamber 62, a moving piston 63 arranged between the two chambers 61, 62, a rod 64 secured to or integral with the piston 63 and a rheostat 60 provided with an electrical resistor 66. The first chamber 61 is closed by a stopper or cap 65 and contains a fluid at a reference pressure corresponding to a reference altitude. The second chamber 62 is in contact with an outside atmosphere outside the aircraft 50 that has a current atmospheric pressure.

The piston 63 and the rod 64 move together when the current atmospheric pressure varies. The rod 64 is connected to a moving electrical terminal 69 of the rheostat 60 and, on moving, induces a variation in the values of electrical resistances between respective ones of the electrical terminals 67, 68 of the electrical resistor 66 and the electrical terminal 69 that forms the outlet of a voltage divider bridge.

For example, the reference altitude is the altitude of the takeoff area from which the aircraft 50 took off, the reference pressure being the atmospheric pressure of the air at that takeoff area. The height of flight of the aircraft 50 relative to the level of the ground from which the aircraft 50 took off is thus measured by the first measurement subsystem 6 in the form of a barometric altitude, by comparing the current atmospheric pressure with the reference pressure.

The first measurement subsystem 6 then emits an analog signal, e.g. in the form of a voltage, that is a function of that height of flight.

Figure 3:
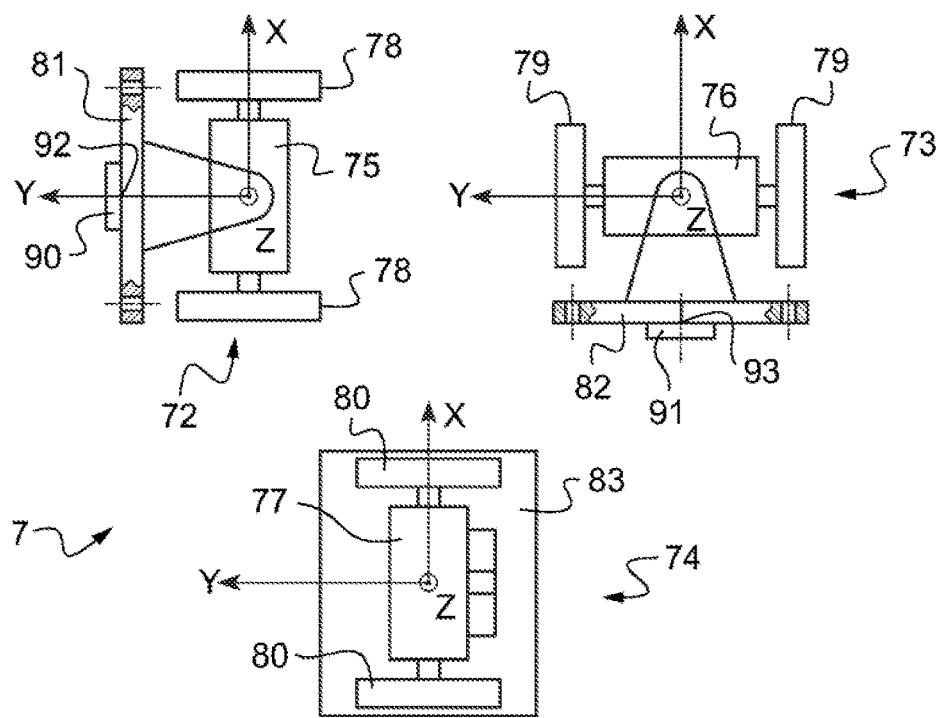
FIGS. 3 to 5 show a second measurement subsystem of a backup measurement system.
Figure 4:
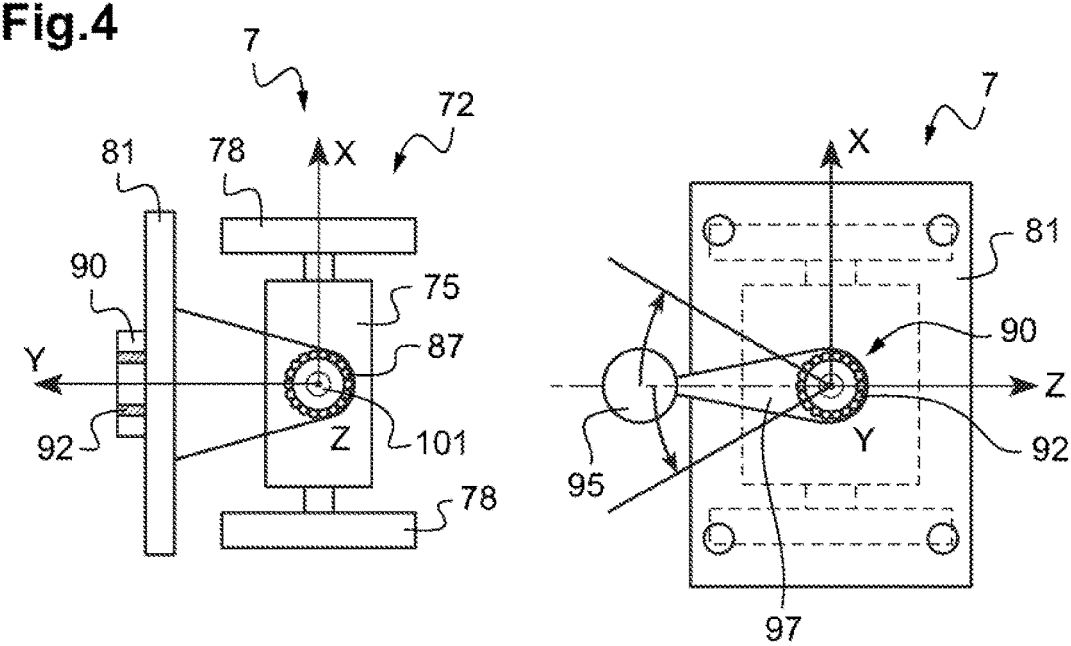
Figure 5:
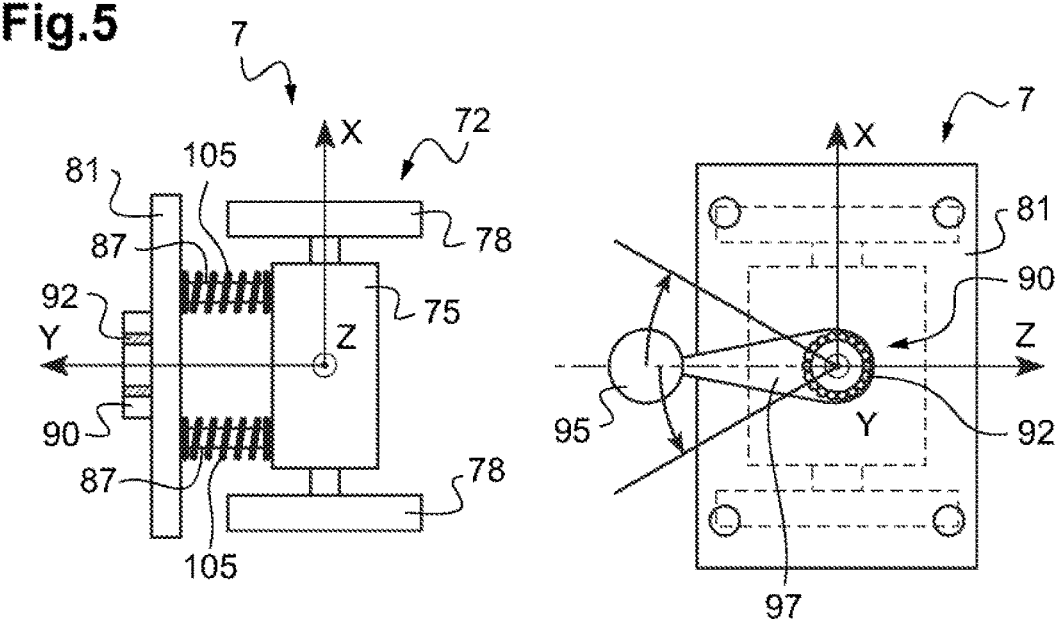

Alternatively, the backup measurement system 20 may include a second measurement subsystem 7 for measuring the angular velocities of the aircraft 50 about the roll, pitch and/or yaw axes, and the trim angles of the aircraft 50 about the roll axis and about the pitch axis, as shown in FIGS. 3 to 5.

The second measurement subsystem 7 may include three gyroscope rate gyros 72-74 and two pendulums 90, 91, as shown in FIG. 3. A first gyroscope rate gyro 72 is dedicated to measuring an angular velocity about the roll axis. A second gyroscope rate gyro 73 is dedicated to measuring an angular velocity about the pitch axis. A third gyroscope rate gyro 74 is dedicated to measuring an angular velocity about the yaw axis.

Each of the gyroscope rate gyros 72-74 includes a base 81-83, an electric motor 75-77 driving two mutually aligned and counter-rotating flywheels 78-80, and a first measurement device 87-89. The axis of rotation of an electric motor 75-77 of a rate gyro 72-74 is perpendicular to the axis corresponding to the angular velocity measured by the gyroscope rate gyro 72-74. Each electric motor 75-77 is mounted to move in rotation relative to its base 81-83 about an axis of rotation that is also perpendicular to the axis of the angular velocity measured and perpendicular to the axis of rotation of the electric motor 75-77.

Each gyroscope 72-74 includes a first measurement device 87-89 arranged between the base 81-83 and the electric motor 75-77 of each gyroscope rate gyro 72-74 for the purpose of measuring, for example, an angular velocity, an angular position, or indeed a turning moment of the electric motor 75-77 relative to the associated base 81-83.

A first measurement device 87 may comprise an encoder of the variable angular resistance type arranged at a pivot-type connection 101 between the base 81 and the electric motor 75 of the rate gyro 72 as shown in FIG. 4.

A first measurement device 87 may comprise a Hall effect sensor or indeed a piezoelectric sensor, springs 105 being arranged between the base 81 and the electric motor 75 of the rate gyro 72 as shown in FIG. 5.

These gyroscope rate gyros 72-74 may be miniaturized by using electric motors and electrical connectors of small volumes and weights.

While the aircraft 50 is moving about an axis, the two counter-rotating flywheels 78-80 of a rate gyro 72-74 generate gyroscopic torque about an axis perpendicular to that axis of movement of the aircraft 50. This gyroscopic torque causes the angular positions of the electric motor 75-77 and of the flywheels 78-80 to vary relative to their base 81-83, when such a movement is possible, and therefore causes the analog signal delivered by the first measurement device 87-89 of the gyroscope 72-74 to vary. The three signals delivered by respective ones of the first measurement devices 87-89 of the three rate gyros 72-74 thus make it possible to characterize the movement of the aircraft 50 about the roll, pitch, and yaw axes. For example, each first measurement device 87-89 delivers voltage that is proportional to the angular velocity of the aircraft 50 about a respective one of these axes.

The pendulums 90, 91 are arranged to swing freely on either side of an apparent vertical of the aircraft 50, and about a connection of the pivot type respectively about the roll axis and about the pitch axis. Each pendulum 90, 91 is connected to a base 81, 82 of a rate gyro 72-73 that measures the angular velocity about the roll axis or about the pitch axis. A second measurement device 92, 93 is arranged between each pendulum 90, 91 and the base 81-82. These two second measurement devices 92, 93 are, for example, encoders of the variable angular resistance type that deliver voltages that are proportional to the angular inclinations of the pendulums 90, 91 and, therefore, proportional to the trim angles of the aircraft 50 about the roll and pitch axes.

Each pendulum 90, 91 has a body 95 positioned at the end of an arm 97 as shown in FIGS. 4 and 5. The period of the oscillations of a pendulum 90, 91 is a function of the weight of the body 95 and of the length of the arm 97. Preferably, a short response time for each pendulum 90, 91 is to be preferred, while also minimizing its dimensions. It is therefore advantageous to choose a dense material for the body 95 of a pendulum 90.

The first measurement subsystem 6 and the second measurement subsystem 7 are connected, e.g. electrically, to the switch-over device 3. The first measurement subsystem 6 is, in particular, connected to the switch-over device 3 via the electrical terminals 67, 68 of the electrical resistor 66 and via the electrical terminal 69 connected to the rod 64. The second measurement subsystem 7 may be connected to the switch-over device 3 via the first measurement devices 87-89 and/or via the second measurement devices 92, 93.

The switch-over device 3 uses the flight characteristics delivered by the first measurement subsystem 6 or by the second measurement subsystem 7, namely the height of flight, the angular velocities and/or the trim angles of the aircraft 50, in the form of analog signals, e.g. in the form of resistances or voltages. The switch-over device 3 is connected to the flight control system 2 in order to transmit said flight characteristics of the aircraft 50, e.g. in the form of an analog signal, for automatically piloting the aircraft 50 via the motors or engines 54 of the lift rotors 55.

The switch-over device 3 may include one or more operational amplifier comparators, flip-flop transistors and/or relays that, for example, switch over as a function of a voltage delivered by the first and/or second measurement subsystem 6, 7. The backup measurement system 20 thereby constitutes an analog measurement system, the flight characteristics of the aircraft 50 being processed in the form of resistances or of voltages that vary continuously, and without using software or microprocessors, in particular.

Figure 6:
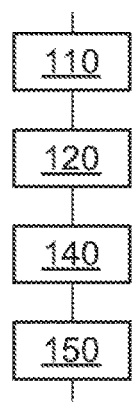
FIG. 6 is a flow chart showing a safe method of controlling a position of an aircraft relative to an authorized flight envelope.

The safe control system 1 makes it possible to implement the safe method of controlling a position of an aircraft 50 relative to an authorized flight envelope, a flow chart of which method is shown in FIG. 6. This method comprises a plurality of steps.

During a measurement step 110, a first value for at least one flight characteristic of the aircraft 50 is measured by the main measurement system 10.

During an emitting step 120, at least one analog signal that is a function of said at least one flight characteristic of the aircraft 50 is emitted by the backup measurement system 20, e.g. by the first and/or the second measurement subsystem 6, 7.

The safe control system 1, and in particular the switch-over device 3, then determines whether a first or a second autopilot mode for automatically piloting the aircraft 50 should be engaged.

During a first autopilot mode 140, the flight control system 2 uses, by default, the first value of each flight characteristic of the aircraft 50 as measured by the main measurement system 10 for the purpose of automatically piloting the aircraft 50. This first mode is thus implemented during operation without failure and/or without malfunctioning being detected on the aircraft 50.

During a second autopilot mode 150, the flight control system 2 uses each analog signal delivered by the backup measurement system 20 in order to pilot the aircraft 50 automatically whenever at least one of the flight characteristics of the aircraft 50 exceeds a predetermined limit or else whenever at least one difference between a first value of a flight characteristic and a second value of said flight characteristic as determined on the basis of an analog signal is greater than or equal to a predetermined value. The first autopilot mode 140 is then stopped and replaced by the second autopilot mode 150.

Thus, the switch-over device 3 makes it possible, following a comparison of the flight characteristics of the aircraft 50 as measured by the main measurement system 10 and/or by the backup measurement system 20 with each other or else with predetermined limits of an authorized flight envelope for the aircraft 50, to switch over, whenever necessary, between the first autopilot mode 140 and the second autopilot mode 150.

During the comparison, the flight characteristics compared with the predetermined limits of the authorized flight envelope may be measured by only one measurement system selected from among the main measurement system 10 and the backup measurement system 20. The comparison may also simultaneously use the flight characteristics as measured by the main measurement system 10 and the flight characteristics as measured by the backup measurement system 20.

The predetermined limits can include a safety margin relative to the real limits of the authorized flight envelope.

The method thus makes it possible to check whether the aircraft 50 is close to the real limits of said authorized flight envelope, or indeed whether the aircraft 50 has left the authorized flight envelope. If it is close to said real limits or if it has left the authorized flight envelope, the second autopilot mode 150 is implemented and replaces the first autopilot mode 140, the flight control system 2 then using the flight characteristics of the aircraft 50 that are delivered by the backup measurement system 20. These flight characteristics delivered in the form of analog signals by the analog backup measurement system 20 are less sensitive to perturbations and therefore limit the risk of using flight characteristics that are unreliable and potentially erroneous and that are delivered by the main measurement system 10.

During this comparison, first values for flight characteristics as measured by the main measurement system 10 may be compared with second values for the same flight characteristics as obtained by means of the backup measurement system 20.

In this way, as soon as at least one difference between the flight characteristics obtained by the main measurement system 10 and by the backup measurement system 20 is greater than or equal to a predetermined value, the method switches over from the first autopilot mode 140 to the second autopilot mode 150.

In addition, if it is established that the aircraft 50 is close to the limits of the authorized flight envelope, the flight control system 2 may automatically maintain the aircraft 50 in the authorized flight envelope, where necessary after having brought the aircraft 50 back into the authorized flight envelope, by using the flight characteristics delivered in the form of analog signals by the backup measurement system 20.

For example, when the height of flight of the aircraft 50 is greater than a maximum height of flight setpoint, the risk of the flight ceiling of the authorized flight envelope being exceeded is detected.

For example, when the aircraft 50 is a drone with a pilot outside the aircraft 50, the maximum height of flight setpoint may be equal to 150 meters (or about 500 feet) for a drone flying in visual line of sight flight, i.e. when the pilot of the drone is situated a short distance away from the drone, typically 100 meters (or about 330 feet) away and sees the drone continuously. The maximum height of flight may also be equal to 50 meters (or about 160 feet) for a drone flying in first-person view flight that may be beyond visual line of sight, i.e. when the pilot of the drone cannot necessarily see the drone, but has a view of the surrounding environment of the drone, typically by means of at least one camera carried by the drone.

Preferably, a safety margin of a few meters, and typically less than 15 meters (or about 50 feet) is subtracted from the maximum height of flight setpoint.

In this situation, the switch-over device 3 uses the height of flight as measured by the first measurement subsystem 6 and communicates it to the flight control system 2 so that the flight control system 2 uses that height of flight to pilot the aircraft 50.

In addition, the second autopilot mode 150 may have a sub-step of controlling the control unit 21 that controls each engine or motor 54 via an analog signal.

For example, with each lift rotor 55 being driven in rotation by an electric motor 54, the control unit 21 receives a voltage delivered by the backup measurement system 20, and typically by the first measurement subsystem 6, said voltage then being representative of the height of flight of the aircraft 50. The control unit 21 then uses the voltage for electrically powering each motor 54. Thus, as soon as the height of flight of the aircraft 50 exceeds the maximum height of flight setpoint, the aircraft 50 descends at controlled speed by means of the variation in the voltage down to a height of flight that is substantially equal to the maximum height of flight setpoint, and then the aircraft 50 is stabilized automatically at a height of flight substantially equal to said maximum height of flight setpoint.

In another example, when at least one of the trim angles of the aircraft 50 about the roll and pitch axes is less than a minimum trim angle setpoint or indeed greater than a maximum trim angle setpoint, the risk of exceeding or going beyond a setpoint corresponding to a predetermined limit of the flight envelope is detected. The minimum or maximum trim angle setpoints may be identical, and thus common, for the pitch and roll axes, or else be specific and dedicated to each of the axes. For example, a common minimum or maximum trim angle setpoint is equal to ±15°. In the particular situation of maneuvering to avoid an obstacle, said common minimum or maximum trim angle setpoint may be equal to ±30°.

In this example, the switch-over device 3 uses the trim angles measured by the second measurement subsystem 7 and communicates them to the flight control system 2 so that the flight control system 2 uses those trim angles to pilot the aircraft 50 in such a manner as to bring the aircraft 50 back to trim angles lying in the range defined by the minimum and maximum trim angle setpoints, and then as to maintain it at trim angles lying in the range defined by said setpoints.

For example, the switch-over device 3 may use values for the trim angles about the roll and pitch axes that are equal to the angles of inclination of the pendulums 90, 91 that are delivered by the second measurement devices 92, 93.

The safe control system 1 may also include an integration device 4 determining the values for the trim angles or the values for the variations in the trim angles by integration of the angular velocity measurements delivered by the first measurement devices 87-89. For example, this integration is performed analogically, typically by one or more operational amplifiers of the integration device 4.

The backup measurement system 20 or indeed the switch-over device 3 may also determine the values for the trim angles by hybridization of the integral values for the angular velocities and for the angles of inclination of the pendulums 90, 91.

Furthermore, a predetermined limit may have two levels of comparison. Thus, when a first level of comparison is exceeded, the flight control system 2 uses the flight characteristics of the aircraft 50 as measured by the backup measurement system 20 and pilots the aircraft 50 while slowing down any progression of the flight characteristic that is deemed to be borderline relative to the authorized flight envelope. Then, if a second level of comparison is exceeded, the second level of comparison then being greater than the first level of comparison, the flight control system 2 acts automatically to bring the aircraft 50 back into the authorized flight envelope, and in particular, for example, to bring the flight characteristic back to below the second level comparison.

A predetermined limit may also take into account a time value and, for example, have a threshold and a critical duration. Thus, the second autopilot mode 150 may, for example, be implemented firstly when a flight characteristic is greater than said threshold and secondly if a duration necessary for that flight characteristic to return to a value less than or equal to the threshold is greater than a critical duration.

The predetermined limit may also include a notion of detection of an obstacle in the surrounding environment of the aircraft 50 as a secondary condition for implementing the second autopilot mode 150, the aircraft 50 then including an obstacle detection device.

The safe control system 1 and the above-mentioned method advantageously make it possible to procure mechanical redundancy in measuring the flight characteristics of the aircraft 50 with a higher level of reliability than by using electronic systems and/or algorithms and software. The safe control system 1 and the method may, in particular, make it possible to certify aircraft 50, and in particular drones, achieving a level of safety and of reliability that is sufficient for the aircraft 50, for the other aircraft flying nearby, and also for the installations on the ground.

Naturally, the present invention can be the subject of numerous variants as to its implementation. Although several implementations and embodiments are described, it should readily be understood that it is not conceivable to identify exhaustively all possible implementations and embodiments.

In particular, any aircraft having at least one lift rotor 54 may include a safe control system 1 for controlling a position of an aircraft 50 relative to its authorized flight envelope, and to apply the above-described safe control method for controlling a position of an aircraft 50 relative to an authorized flight envelope.

It is naturally possible to envisage replacing any of the means described by equivalent means without going beyond the ambit of the present invention.

What is claimed is:

1. A safe method of controlling a position of an aircraft relative to an authorized flight envelope, the safe method comprising the following steps:
    measuring a first value for at least one flight characteristic of the aircraft by means of a main measurement system of the aircraft, the flight characteristic(s) being used by a flight control system of the aircraft for automatically piloting the aircraft in the authorized flight envelope;
    emitting at least one analog signal that is a function of the flight characteristic(s) of the aircraft by means of an analog backup measurement system of the aircraft;
    applying a first autopilot mode for automatically piloting the aircraft that is implemented by default by the flight control system by using the first value for at least one flight characteristic of the aircraft for automatically piloting the aircraft; and
where in the method comprises the following steps:
    applying a second autopilot mode for automatically piloting the aircraft that is implemented by the flight control system by using the analog signal(s) for automatically piloting the aircraft whenever at least one of the flight characteristics of the aircraft exceeds a predetermined limit, or indeed whenever at least one difference between the first value for a flight characteristic and a second value for the flight characteristic that is determined on the basis of the analog signal is greater than or equal to a predetermined value to maintain the aircraft or to bring the aircraft back into the authorized flight envelope.

2. The method according to claim 1,
    wherein the analog signal(s) include(s) at least one piloting analog signal and at least one switch-over analog signal, the pilot analog signal(s) being dedicated to the second autopilot mode for automatically piloting the aircraft and the switch-over analog signal(s) being dedicated to a comparison of the flight characteristic(s)

of the aircraft with the predetermined limit of the authorized flight envelope, or indeed to a comparison of the first value for a flight characteristic with a second value for the flight characteristic that is determined from the analog signal.

3. The method according to claim 1,
wherein the flight characteristic(s) include(s) trim angles for rolling and pitching of the aircraft respectively about a roll axis and about a pitch axis of the aircraft.

4. The method according to claim 3,
wherein the emitting step is performed by means of the following steps:
generating at least two analog signals, which generation is performed by at least two gyroscope rate gyros arranged on respective ones of the pitch and roll axes;
determining angular velocities for the aircraft about the pitch and roll axes on the basis of the at least two analog signals; and
determining the trim angles by integrating the angular velocities.

5. The method according to claim 3,
wherein the emitting step is performed by means of the following steps:
generating at least two analog signals as a function of respective ones of the angles of inclination of at least two pendulums relative to an apparent vertical of the aircraft about respective ones of the pitch and roll axes, the pendulums swinging about respective ones of the pitch and roll axes and on either side of the apparent vertical of the aircraft;
determining the angles of inclination of the pendulums on the basis of the at least two analog signals; and
determining the trim angles of the aircraft that are equal to the angles of inclination of the pendulums.

6. The method according to claim 3,
wherein the emitting step is performed by means of the following steps:
generating at least two analog signals, which generation is performed by at least two gyroscope rate gyros arranged on respective ones of the pitch and roll axes;
determining angular velocities for the aircraft about the pitch and roll axes on the basis of the at least two analog signals;
generating at least two analog signals as a function of respective ones of the angles of inclination of at least two pendulums relative to an apparent vertical of the aircraft about respective ones of the pitch and roll axes, the pendulums swinging about respective ones of the pitch and roll axes and on either side of the apparent vertical of the aircraft;
determining the angles of inclination of the pendulums on the basis of the at least two analog signals; and
determining the trim angles by hybridization firstly of the integrals of the angular velocities of the aircraft about the pitch and roll axes and secondly of the angles of inclination of the pendulums in order to determine the trim angles.

7. The method according to claim 5,
wherein the second autopilot mode is implemented:
whenever an angle of inclination of one of the pendulums is greater than a first threshold; or indeed
when firstly the angle of inclination of one of the pendulums is greater than a second threshold, the second threshold being less than the first threshold, and secondly a height of flight of the aircraft is less than a critical height of flight.

8. The method according to claim 1,
wherein the flight characteristic(s) include(s) the height of flight of the aircraft.

9. The method according to claim 8,
wherein the emitting step comprises the following steps:
comparing an outside atmospheric pressure outside the aircraft with a reference pressure, the reference pressure being equal to an atmospheric pressure at a takeoff area from which the aircraft took off;
varying an electrical resistance as a function of a difference between the outside atmospheric pressure outside the aircraft and the reference pressure; and
generating an analog signal that is proportional to the electrical resistance.

10. The method according to claim 1,
wherein the predetermined limit is equal to a real limit of the authorized flight envelope of the aircraft to which real limit a safety margin is added.

11. The method according to claim 1,
wherein the second autopilot mode is implemented when a flight characteristic is greater than a threshold and if a duration necessary for the flight characteristic to return to a value less than or equal to the threshold is greater than a critical duration.

12. The method according to claim 1,
wherein, with the aircraft including at least one lift rotor driven in rotation by an electric motor, the second autopilot mode includes a sub-step of controlling a control unit that controls the motor by means of the analog signal(s).

13. A safe control system for performing control of a position of an aircraft relative to an authorized flight envelope, the aircraft including:
at least one main measurement system for measuring a first value for at least one flight characteristic of the aircraft; and
a flight control system for automatically piloting the aircraft by using the flight characteristics of the aircraft;
wherein the safe control system is configured to:
measure a first value for at least one flight characteristic of the aircraft by means of a main measurement system of the aircraft, the flight characteristic(s) being used by a flight control system of the aircraft for automatically piloting the aircraft in the authorized flight envelope;
emit at least one analog signal that is a function of the flight characteristic(s) of the aircraft by means of an analog backup measurement system of the aircraft;
apply a first autopilot mode for automatically piloting the aircraft that is implemented by default by the flight control system by using the first value for at least one flight characteristic of the aircraft for automatically piloting the aircraft; and
where in the method comprises the following steps:
apply a second autopilot mode for automatically piloting the aircraft that is implemented by the flight control system by using the analog signal(s) for automatically piloting the aircraft whenever at least one of the flight characteristics of the aircraft exceeds a predetermined limit, or indeed whenever at least one difference between the first value for a flight characteristic and a second value for the flight characteristic that is determined on the basis of the analog signal is greater than or equal to a predetermined value to maintain the aircraft or to bring the aircraft back into the authorized flight envelope, and wherein the safe control system includes:

at least one analog backup measurement system that delivers at least one analog signal that is a function of the flight characteristic(s) of the aircraft; and a switch-over device configured to transmit to the flight control system the first value by default, and a second value for the flight characteristic that is determined on the basis of the analog signal whenever at least one flight characteristic of the aircraft exceeds a predetermined limit or indeed whenever at least one difference between the first value and the second value for the flight characteristic is greater than or equal to a predetermined value.

14. The system according to claim 13, wherein the backup measurement system includes a first measurement subsystem for measuring a barometric altitude of the aircraft, the first measurement subsystem including a closed first chamber, a second chamber, a piston and a rheostat, the closed first chamber containing a fluid at a reference pressure, the second chamber being in contact with an outside atmosphere through which the aircraft is flying, the piston being arranged between the first and second chambers and moving when an atmospheric pressure of the outside atmosphere varies, the rheostat being connected mechanically to the piston and electrically to the switch-over device, so that the rheostat delivers an analog signal that varies as a function of the movement of the piston to the switch-over device and/or to the flight control system).

15. The system according to claim 13, wherein the backup measurement system includes a second measurement subsystem, the second measurement subsystem including at least two gyroscope rate gyros, arranged on respective ones of the roll and pitch axes, the second measurement subsystem including two pendulums, each pendulum being connected to a base via a pivot-type connection for pivoting about the pitch axis or the roll axis, each gyroscope rate gyro being provided with a first measurement device that delivers a first analog signal that is proportional to the angular velocity about the roll axis or about the pitch axis, the second measurement subsystem being equipped with two second measurement devices arranged between respective ones of the pendulums and the base and delivering a second analog signal that is proportional to the angle of inclination of the pendulum relative to an apparent vertical of the aircraft.

16. The system according to claim 15, wherein each gyroscope rate gyro includes a base and an electric motor that drives two mutually aligned and counter-rotating flywheels, an axis of rotation of the electric motor being perpendicular to the axis corresponding to the angular velocity measured by the gyroscope rate gyros, the electric motor being connected to the base via a pivot-type connection arranged perpendicularly to the axis corresponding to the measured angular velocity and perpendicularly to the axis of rotation of the electric motor, the gyroscope rate gyros being provided with a first measurement device arranged between the electric motor and the base and delivering a first analog signal that is proportional to the angular velocity.

17. The system according to claim 13, wherein the backup measurement system of the aircraft is electrically powered in autonomous and independent manner by at least one electrical energy source.

18. The safe control set for controlling a position of an aircraft relative to an authorized flight envelope, the safe control set including:

at least one main measurement system for measuring a first value for at least one flight characteristic of the aircraft;

a flight control system for automatically piloting the aircraft; and the safe control system for controlling a position of an aircraft relative to the authorized flight envelope;

wherein the safe control system is a safe control system according to claim 13.

19. An aircraft including:

at least one lift rotor;

at least one main measurement system for measuring a first value for at least one flight characteristic of the aircraft; and a flight control system for automatically piloting the aircraft;

wherein the aircraft includes the safe control system for controlling a position of the aircraft relative to an authorized flight envelope according to claim 13.

20. The aircraft according to claim 19, wherein the aircraft is a multi-rotor drone including at least two lift rotors.

* * * * *